Dec. 24, 1963

L. SAPER 3,115,615

MEASURING SYSTEMS

Filed Aug. 16, 1960

INVENTOR.
Lawrence Saper
BY
Philip S. Hilbert
ATTORNEY.

Dec. 24, 1963  L. SAPER  3,115,615
MEASURING SYSTEMS
Filed Aug. 16, 1960  2 Sheets-Sheet 2

INVENTOR.
Lawrence Saper
BY
*Philip J. Hilbert*

ATTORNEY.

United States Patent Office 3,115,615
Patented Dec. 24, 1963

3,115,615
MEASURING SYSTEMS
Lawrence Saper, Bronx, N.Y., assignor to Bogue Electric Manufacturing Co., Paterson, N.J., a corporation of New Jersey
Filed Aug. 16, 1960, Ser. No. 49,975
21 Claims. (Cl. 340—3)

This invention relates to systems for the measurement of physical quantities of a medium, and more particularly, concerns the performance of such measurements through the use of sonic transducers.

The time of travel of sonic pulses of energy in a given medium may be used to indicate directly the volume and weight of the medium. The time of travel can also be used, less directly, to indicate temperature, density and elastic modulii of said medium. The present invention, in some aspects, provides improvements in respect to the systems disclosed in Patents 2,753,542 and 2,775,748.

Although the inventions disclosed in said patents are operative to measure the volume of liquid in a vessel, there has been a demand for improved systems which show a higher degree of precision in measurements. Certain applications require a precision of measurement which is at least one order of magnitude better than that attainable with the systems of said patents.

In addition, it is now highly desirable to obtain precise measurements of the weight of a liquid medium. This form of measurement must take into account the density of the medium, which may vary with the temperature. It is therefore necessary to constantly monitor the medium temperature and introduce correction factors; or, alternatively, provide a measurement system which is independent of temperature.

The weight of a liquid in a container of known cross-section, can be obtained from continuous measurement of the varying liquid level and the varying liquid density. Both measurements are readily performed by methods involving sonic pulse-ranging in the liquid.

When the cross-sectional area at each elevation of a vessel is known, it is possible to obtain a measure of the liquid volume by measuring the time of travel of a sonic pulse of energy between a known point at or near the base of the vessel and the surface of the liquid; such transit time varying with temperature conditions.

It is therefore an object of this invention to provide improved means for measuring the quantity of liquid in a container, utilizing an improved sonic pulse system.

Another object of this invention is to provide an improved system operative to precisely measure the level of the liquid in a container, and to precisely measure the relative density of said liquid.

A further object of this invention is to provide improved means for precisely measuring, independent of temperature, the liquid level in a container subject to varying temperatures, by sonic techniques which are usually temperature dependent. It is to be noted that the term sonic as used herein is intended to include supersonic and ultrasonic.

In accordance with this aspect of the invention, a system is provided for measuring liquid levels which include sonic transducer means disposed within the liquid. Such transducer means includes elements operative to allow a pulse of sonic energy transmitted by the transducer means to be received by the transducer means after the pulse has travelled a precise predetermined distance within the liquid.

Such transducer means in a preferred embodiment of the invention, includes a transducer spaced a precise distance from a reflector. The pulse of energy emitted by the transducer is propagated toward the reflector and is reflected back to the transducer. In this case, the transducer acts as a transmitter and receiver.

In an alternative form, the transducer means comprises first and second transducers spaced a predetermined distance from each other. The first transducer may act solely as a transmitter and the second transducer acts solely as a receiver for the energy transmitted by the first transducer.

Means is provided for exciting the transducer means and further means responsive to the operation of the transducer means, triggers the exciting means each time a pulse of sonic energy has travelled a predetermined distance in the liquid. Thus, a first series of signals is generated which have a frequency related to the said predetermined distance. A frequency divider means divides such signals to provide at least a second series of signals having a frequency less than that of the first series.

The second series of signals is supplied to a sonic transducer located in the liquid for transmitting pulses of sonic energy toward the surface of the liquid. Means is provided for receiving the signals generated by the sonic transducer means in response to the pulses of energy reflected from the surface of the liquid. Indicating means responsive to signals from the receiving means and the first series of signals, indicates the quantity of liquid as determined by time relationship of the signals from the receiving means and the signals from the frequency divider means.

Thus, if the transducer is located at the bottom of a liquid container, the elapsed time between a signal of the first series and the associated signal from the receiving means, indicates the liquid level. On the other hand, where a liquid level is approximately known in advance, e.g. the liquid level is usually in terms of 70–80% capacity, it is unnecessary to measure the distance up to the usual level and measurements may be taken between the usual, say 70% level and the actual level.

Since measurements can thus be made over a relatively short range of distance, more precise measurements can be made. Accordingly, a feature of this invention provides for the frequency divider means to generate a second series of signals having a phase difference relative to the first series of signals, to start the level measurements by the indicating means at a time related to the occurrence of the selected measuring range, i.e. at a time when a sonic pulse of energy arrives at the 70% capacity level in the example mentioned above.

As stated above, the weight of a given quantity of liquid is equal to the product of the liquid density and the fluid volume. While mean densities may be used in such calculations, temperature changes may introduce substantial errors. Accordingly, a further object of the invention is to provide improved means for measuring a physical quantity which determines the velocity of propagation of sonic disturbances in a given fluid or liquid medium.

Yet another object of this invention is to provide improved means for continuously measuring fluid densities and to utilize improved sonic ranging techniques for such purposes.

In accordance with this aspect of the invention, a system is provided which includes sonic transducer means operatively disposed with respect to the medium. Such transducer means includes means for transmitting a pulse of sonic energy in the medium and receiving said pulse after the same has travelled a precise distance in the medium. Thus, means is provided for exciting the sonic transducer, and further means responsive to the operated transducer, triggers the exciting means each time a pulse of sonic energy has travelled a predetermined distance and is received by the transducer, to generate signals having a frequency related to the transit time. Frequency sensitive means receive said signals to give an indication of the value of the desired physical quantity.

In many instances, measurement precision is of a high order, yet known variations affecting such measurements may be in a relatively small range. Thus, in some weight measurement applications, temperature changes may be over a small range. Within such range, velocity of propagation of sonic disturbances varies linearly with density. Therefore, if the velocity of propagation is precisely known for a mean density within the range, the density at other points within the range may be found, provided a suitable multiplier or slope is known. The precision of the value of the multiplier can be less than the precision of the mean value.

Within the limited range:

$$p = p_0(1 + a_p T) \quad (1)$$
$$v = v_0(1 + a_v T) \quad (2)$$

where; $p$=density; $p_0$=density at mean temperature; $a_p$=density-temperature coefficient (a known constant); $T$=temperature; $v$=velocity of propagation of medium; $v_0$=velocity at mean temperature; $a_v$=velocity-temperature coefficient (a known constant).

Differentiating the Equations 1 and 2 with respect to temperature, yields:

$$\frac{dp}{dT} = p_0 \cdot a_p \quad (3)$$

$$\frac{dv}{dT} = v_0 \cdot a_v \quad (4)$$

Dividing Equation 3 by Equation 4:

$$\frac{dp}{dv} = \frac{a_p}{a_v} \cdot \frac{p_0}{v_0}$$

$$dp = K \cdot dv$$

where $$K = \frac{a_p}{a_v} \cdot \frac{p_0}{v_0}$$

Thus, it is seen that over a limited temperature range, density varies linearly with the temperature.

Therefore, it is a feature of this aspect of the invention, to measure the deviation in the magnitude of a physical quantity when the physical quantity determines the velocity of propagation of sonic disturbances in a given medium. Accordingly, frequency sensitive means in the form of a frequency discrinimator is tuned to the frequency that the signals would have at the mean temperature, whereby the frequency discriminator transmits a signal whenever the physical quantity deviates from the mean value.

Other aspects of the invention are concerned with means operative to indicate with precision the weight of a medium within a container.

Still other objects of this invention will in part be obvious and in part hereinafter pointed out.

Figure 1:
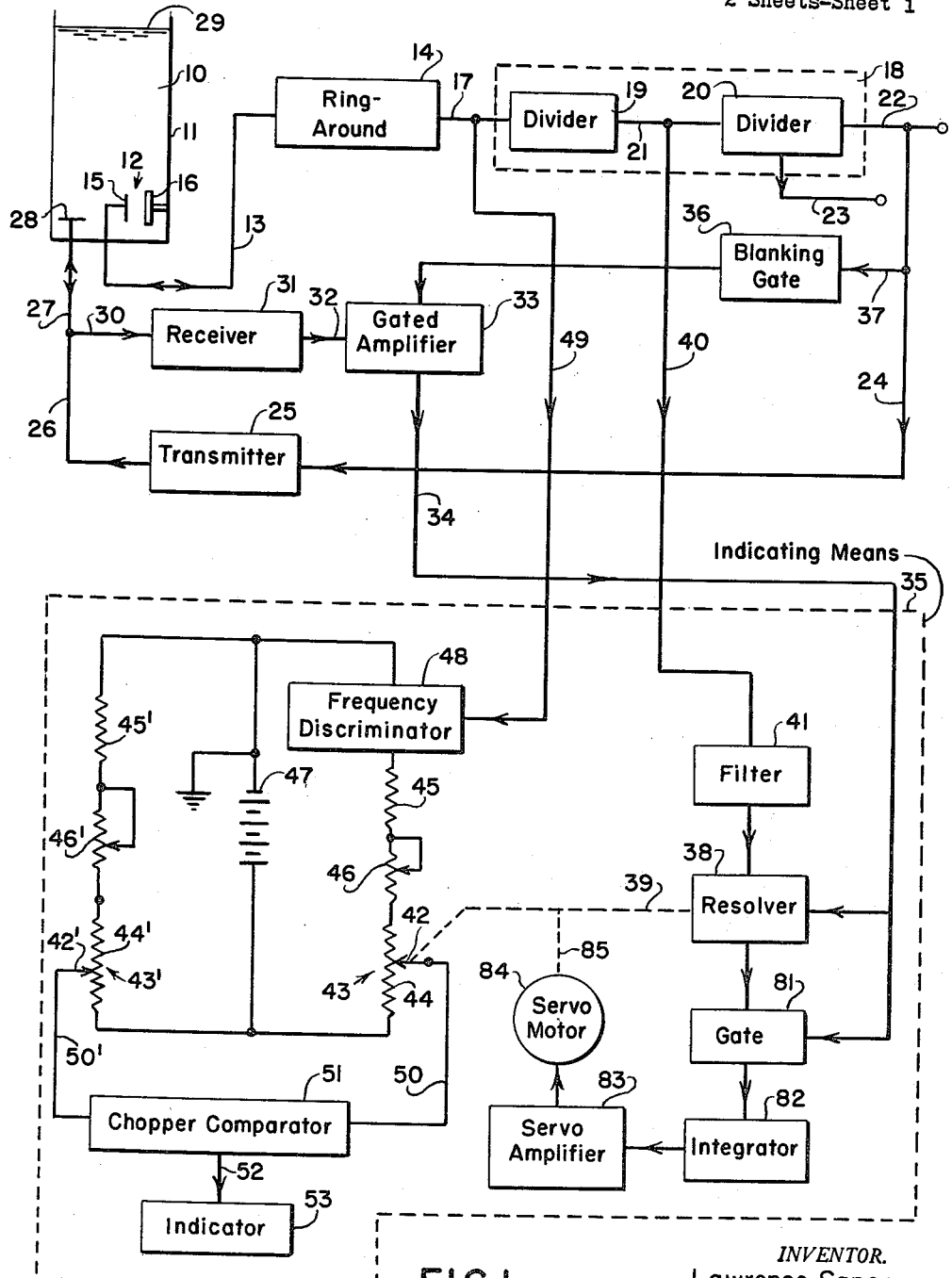
FIG. 1 shows a system in block diagram form, for measuring the weight of a medium in a container, in accordance with one aspect of the invention.

Referring to FIG. 1, a system is shown for measuring the weight of a liquid 10 in a container 11. Such a system includes a first sonic transducer means 12 located in the liquid 10 and electrically coupled via line 13 to a ring-around element 14. The combination of sonic transducer means 12 and ring-around element 14 may be considered as a calibration means for the system, since they cooperate to give high precision signals indicative of extremely accurate increments of distance.

Transducer means 12 in a preferred embodiment comprises a transmitting and receiving transducer 15 and a reflector 16. Transducer 15 may take the form of a conventional piezo-electric element located in liquid 10 and aimed to transmit sonic disturbances or pulses of sonic energy transversely across container 11. In the path of such energy propagation is disposed reflector 16 at a precise, determined distance from transducer 15, as for example 1 foot.

Thus, the round trip of a pulse of sonic energy between transducer 15 and reflector 16 over the distance of 1 foot is precisely 2 feet and may be designated as 1 round trip foot. Ring-around element 14, hereinafter more fully described, is essentially a pulse generator which transmits an electric signal or pulse each time it receives a pulse. Generally speaking, ring-around element 14 transmits a pulse of electrical energy via line 13 to transducer 15, which transforms such pulse to sonic energy which is propagated toward reflector 16. The pulse of sonic energy is reflected back to transducer 15 where it is reconverted to a pulse of electrical energy which is transmitted by line 13 to element 14, causing element 14 to generate another pulse of electrical energy which is supplied by line 13 to transducer 15.

Ring-around element 14 also transmits such pulses along line 17 as a series of signals having a frequency related to the round-trip distance travelled by the pulses of sonic energy in liquid 10. Thus, since reflector 16 is displaced from transducer 15 by one foot, the pulses transmitted along line 17 indicate one round-trip foot increments in liquid 10.

Frequency divider or pulse repetition rate divider means 18 receives pulses from line 17 and performs several frequency divisions. Divider means 18 comprises dividers 19, 20 which may be of conventional design such as cascaded binary counter stages and generates three series of signals. Divider 19 transmits to line 21 a series of pulses having a repetition rate that is ¼ of the pulse repetition rate of pulses received from line 17.

Thus, the pulses on line 19 indicate four round-trip foot increments in liquid 10. The frequency division performed by divider 20 is determined by the maximum possible height of the liquid 10 in container 11. It is desirable to generate pulses indicating an increment greater than the maximum round-trip distance of a pulse of sonic energy from the bottom to the top and back to the bottom of container 11. Therefore, if it is assumed that the maximum height of container 11 is thirty-two feet, divider 20 should comprise at least four cascaded binary counter stages so that there is a division by eight.

Thus, divider 20 will transmit a series of signals or pulses indicating thirty-two round-trip foot increments. Or, divider 20 transmits pulses via line 22 having a period equal to the maximum time for the round-trip of a pulse of sonic energy from the bottom of container 11 to the top thereof, and back to the bottom. In addition, divider 20 transmits to line 23 a second series of signals having the same repetition rate as the signals on line 22 but occurring earlier in time. Such a series of signals is readily obtainable by using well known techniques of gating, together with the outputs of the binary counters in divider 20.

The signals or pulses on line 22 are supplied by line 24 to transmitter 25 for amplification. The amplified pulses are fed to lines 26, 27, to a transducer 28 located at a precisely determined distance from the bottom of container 11, and is oriented to direct pulses of sonic energy toward the surface 29 of liquid 10.

Since the time intervals between such pulses is equal to the time of travel for a maximum height of liquid, only one such pulse will travel in liquid 10 at any given time. In any event, transducer 28 gives rise to pulses of sonic energy which are reflected back to said transducer from liquid surface 29. Upon receiving the reflected pulse, transducer 28 generates an electrical pulse that is fed via lines 27, 30 to receiver 31. After amplification in receiver 31, the pulse is fed via line 32 to gated amplifier 33, from which the pulse travels via line 34 to indicating means generally indicated at 35.

Since line 27 is common to transmitter 25 and receiver 31, pulses transmitted by transmitter 25 are received by receiver 31 and transmitted to line 32. To prevent such pulses from entering indicating means 35, gated amplifier 33 is blocked during transmission of such pulses by blanking gate 36. Blanking gate 36 receives via line 37, the same pulses received by transmitter 25. Whenever blanking gate 36 receives a pulse, it transmits an inhibitory signal to gated amplifier 33. Such signal need only have a duration slightly longer than the time of the pulse transmitted by transmitter 25.

Although indicating means 35 may take various forms, a preferred embodiment is shown in FIG. 1; which embodiment is particularly suited for indicating when a predetermined weight of liquid is in container 11. This is particularly effective when the density of the liquid is temperature sensitive and the temperature is fluctuating about a mean temperature.

Basically, analogue computing techniques using a resolver and function potentiometers feeding a voltage comparator, are employed. More specifically, a conventional synchro type resolver 38 receives at one of its inputs the pulses from gated amplifier 33 via line 34. Resolver 38 receives a sinusoid at its other input.

The phase relation between the sinusoid and the pulses varies as the level of liquid changes in container 11. Hence, a servo system is used to move the shaft 39 of resolver 38 to a position corresponding to the existing phase relationship. Such a system comprises a gate 81, which opens each time a pulse is received, to examine the output of resolver 38, which may be either zero, indicating agreement; or some value plus or minus, indicating disagreement. These pulses are integrated by integrator 82, amplified by servo amplifier 83, whose output is fed to servo motor 84.

The shaft 85 of servo motor 84 is rotatably connected to the shaft 39 of resolver 38, in a manner as to keep the output of resolver 38 at zero. Thus, if the output of divider 19 equals four feet, as described above, the shaft 39 of resolver 38 will rotate 360° for a change of four feet.

The precision of the resolver 38 is greater when the period of the sinusoid is much shorter than the period between pulses from the gated amplifier 33. Thus, the sinusoid is derived from the series of pulses generated by the divider 19. These pulses are fed via line 40 to filter 41 which passes substantially the first harmonic. It should be noted that the pulses from the gated amplifier 33 are derived from the output of divider 20. Therefore, the period of the sinusoid is eight times shorter than the repetition period of the pulses derived from the gated amplifier 33 and a high degree of precision is obtained.

Shaft 39 of resolver 38 is insulatively coupled to moving contact 42 of function potentiometer 43. The resistance 44 of potentiometer 43 is calibrated to take into account the mean density of liquid 10, and the cross section of container 11. Since in many applications, container 11 will be filled to a predetermined height or to contain a predetermined weight of liquid, it is only necessary to start monitoring the liquid level when such height is within about 10% of the desired level.

Accordingly, resistance 44 need only account for such limited range of values, and a high degree of measurement accuracy results. The remainder of the range can be accounted for by means of fixed resistance 45. To account for slight variations in the remainder of the range of values, a variable resistor 46 is provided.

Although it is possible to connect the serially disposed resistances 44, 45 and 46 directly across a source of potential 47, to obtain the analogue voltage at the moving contact 42, which indicates the weight of liquid 10; such analogue voltage would only give a true reading if the density of liquid 10 remained constant and equal to the mean density used in calibrating the value of resistance 43.

However, in accordance with a feature of the invention, a frequency discriminator 48 is serially interposed between the serially connected resistances 44, 45, 46 and potential source 47. Frequency discriminator 48, which is of conventional design, receives via line 49, pulses from the ring-around element 14. It should be recalled that the pulses from ring-around element 14 has a period equal to the time of the round-trip travel of a pulse of sonic energy over a fixed distance.

Thus, if the sonic pulse travels at a faster velocity through liquid 10, the period will be shorter and the frequency of the pulses increase. The opposite will be true, if the pulses travel at a slower rate. Since the density of the liquid 10 is one of the physical characteristics that determine the velocity of propagation of pulses passing therethrough, the frequency of the pulses transmitted by the ring-around element 14 give an indication of the liquid density.

Accordingly, discriminator 48 is tuned to the frequency the pulses would have, if the density were the mean density. The resultant voltages generated by discriminator 48 reflect the variation from said mean density. Such generated voltages are added to the voltage of the potential source 47. Thus, the analog voltage on moving contact 42 is a true indication of the weight of liquid 10.

To precisely fill container 11 with a predetermined weight of liquid, in an automatic manner, an identical potentiometer-resistance configuration is disposed across potential source 47, omitting discriminator 48. Thus, moving contact 42' of function potentiometer 43' is positioned on calibrated resistance 44'. Lines 50 and 50' respectively connect moving contacts 42, 42' to the two inputs of a conventional chopper comparator 51 which may sense for a null difference in the analog voltages. When a null is sensed, a signal is transmitted via line 52 to an indicator 53 which shows the desired weight of liquid 10 in container 11. Resistances 45', 46' correspond respectively to resistances 45, 46 of potentiometer 43.

Figure 2:
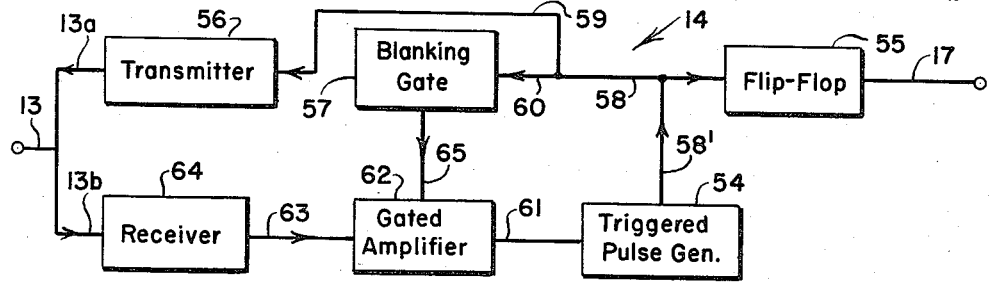
FIG. 2 shows a block diagram detailing the ring-around element of FIG. 1.

In FIG. 2, the ring-around element 14 is shown in detail. The same comprises a triggered pulse generator 54, which may be of the conventional blocking oscillator type. The oscillator has a natural or free running period that is longer than the maximum round-trip transit time for a pulse of sonic energy to travel a round-trip foot in liquid 10. The blocking oscillator 54 is provided in a conventional manner, with a synchronizing input which will cause the oscillator to generate a pulse whenever a pulse is received on the synchronizing input. Thus, the series of pulses generated by the oscillator will follow the series of pulses received via the synchronizing input, providing, their period is shorter than the free running period of the blocking oscillator.

The pulses generated by the triggered pulse generator 54 are supplied to flip-flop 55, transmitter 56 and blanking gate 57 by way of lines 58, 59 and 60 respectively. Synchronizing pulses are received by generator 54 via line 61, gated amplifier 62, line 63 and receiver 64, which are serially connected in order.

The flip-flop 55 may be a bi-stable multivibrator and blanking gate 57 may be a conventional one shot multivibrator. Transmitter 56 may take the form of a power amplifier, while receiver 64 may be a voltage amplifier. Gated amplifier 62 may be of the type which will pass a signal received via one input, provided there is no signal on its inhibitory input.

The ring-around element 14 will now be described in connection with FIGS. 1 and 2. The first pulse generated by generator 54 will occur because of its free running characteristic. Such pulse is transmitted via lines 58', 58 to flip-flop 55 for transmission via line 17 to pulse repetition rate divider 18. At the same time, the pulse is fed via line 59 to transmitter 56 for transmission via lines 13a, 13 to transducer 15, shown in FIG. 1.

Transducer 15 accordingly transmits a pulse of sonic energy toward reflector 16 and the reflected pulse of sonic energy is received by transducer 15 and converted to an electrical pulse fed to receiver 64 by way of line 13b. The amplified pulse is transmitted via gated amplifier 62 to the synchronizing input of generator 54, causing the same to generate a second pulse. The second pulse causes the same set of events to occur. Accordingly, a series of pulses in square wave form is transmitted from flip-flop 55 having a frequency determined by the transit time of the pulses of sonic energy in liquid 10.

It should be noted that the receiver 64 is effectively coupled to the transmitter 56 via lines 13a, 13b. Thus, receiver 64 will transmit pulses to gated amplifier 62 at the start and end of a round trip of the sonic pulses of energy. However, triggered pulse generator 54 should only receive a pulse at the end of the round trip to initiate a new cycle. Therefore, the pulses emitted by generator 54 are also fed via line 60 to blanking gate 57 which supplies the inhibitory signal via line 65 to gated amplifier 62. The inhibitor signal need only have a duration long enough to insure that the pulse transmitted from transmitter 56 has terminated.

Figure 3:
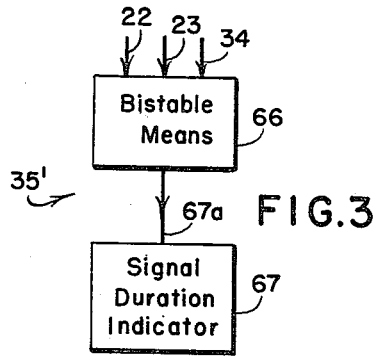
FIG. 3 shows an alternative embodiment of the indicating means of FIG. 1.

Although a preferred form of indicating means 35 is described in FIG. 1; other indicating means may be used. For example, when only a liquid level indication is desired, the indicating means 35' shown in FIG. 3 may be used. Such means 35' comprises a bistable means 66, which may be a conventional trigger with two inputs. Signals received via one input turn the trigger on; while signals received via the other input, shut the trigger off. The signal duration indicator coupled via line 67a to bistable means 66, may be a conventional direct current meter or oscilloscope.

In one mode of operation, it may be desired to indicate the total level of liquid present. In such case, the set or turning-on input of bistable means 66 is coupled via line 22 to the pulse repetition rate divider 18, shown in FIG. 1. It should be noted that the pulses on line 22 are fed to transmitter 25, shown in FIG. 1, at the start of the level measurement cycle. The reset or turning-off input of bistable means 66 is coupled via line 34 to the gated amplifier 33, shown in FIG. 1.

It is also noted that the signals transmitted by the gated amplifier 33 occur at the end of the measurement cycle. Thus, bistable means 66 is turned on when a pulse of sonic energy is transmitted by transducer 28, shown in FIG. 1; and turned off when transductor 28 receives the sonic pulse of energy after reflection from liquid surface 29. The "on" time of bistable means 66 is equal to the round-trip transit time of the sonic pulse of energy in liquid 10. Thus, if signals duration indicator 67 is a direct current meter, its scale can be calibrated in terms of distance, since it acts as an integrating device.

If a more precise measurement indication is required over a range of values in a limited zone in liquid 10 immediately adjacent the level thereof, it is possible to turn bistable means 66 "on" later in the measuring cycle. This is effected by connecting the set input of device 66 by lead 23 to pulse repetition divider 18. It may be recalled that the signals on line 23 have the same frequency as pulses on line 22, but occur at a different time or phase. More, precisely, since they occur earlier in time, it is only necessary to use the pulse from the succeeding measuring cycle. Of course it will be necessary to calibrate the indicating meter to encompass the limited zone of liquid 10, in which measurements are to be made. When an oscilloscope is used as the signal duration indicator 67, it will be necessary to calibrate pulse width on the screen thereof to the liquid levels.

Figure 4:
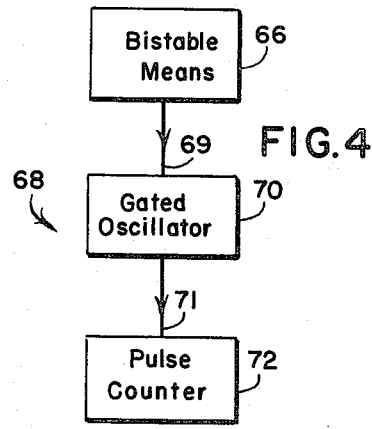
FIG. 4 shows an alternative embodiment of the signal duration indicator of FIG. 3.

In FIG. 4 is shown another form of the signal duration indicator, generally indicated at 68; the same using pulse counting techniques. Thus, bistable means 66 is coupled via line 69 to a conventional gated oscillator 70 which transmits pulses at a known frequency as long as bistable means 66 is "on." Such pulses are fed via line 71 to a conventional recycling pulse counter 72. Thus, the count of pulses generated by oscillator 70 during each cycle can be calibrated to the liquid levels.

Returning to FIG. 1, it should be noted that the sub-system comprising transducer 15, reflector 16, ring-around element 14 and frequency discriminator 48 may be employed separately to measure certain characteritsics of liquid 10. Since the distance between transducer 15 and reflector 16 is precisely determined, the frequency of pulses transmitted from ring-around element 14 are solely dependent on the propagation of the sonic pulses of energy in liquid 10. This velocity is directly dependent on the density of the liquid 10 and indirectly dependent on the temperature of said liquid. By measuring the voltage output of discriminator 48, it is possible to measure liquid densities and temperatures.

Figure 5:
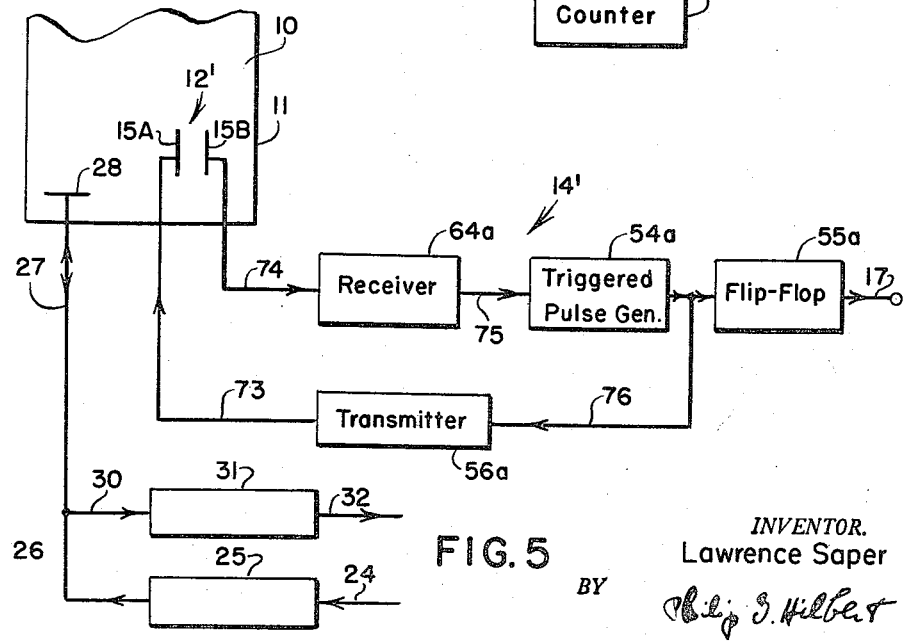
FIG. 5 shows an alternative arrangement of the calibrating transducer means and modified form of the ring-around element.

An alternative form of the sonic transducer means 12' and a modified form of ring-around element 14', is shown in FIG. 5. Here, a transmitting transducer 15A and a receiving transducer 15B are precisely spaced from each other at a predetermined distance within container 11. Transducer 15A is coupled via line 73 to transmitter 56a and transducer 15B is coupled via line 74 to receiver 64a. Blanking gate 57 and gated amplifier 62, shown in FIG. 1, are eliminated; and receiver 64a is connected directly via line 75 to triggered pulse generator 54a.

Thus, a pulse from generator 54a is fed via line 76, transmitter 56a and line 73 to transmitting transducer 15A. In response to this pulse, transducer 15A causes a pulse of sonic energy to be propagated toward receiving transducer 15B. In response to such pulse of sonic energy, transducer 15B transmits a pulse signal via line 74, receiver 64a, line 75 which retriggers pulse generator 54a. Thus, if transducers 15A, 15B are spaced two feet apart, modified ring-around element 14' will transmit the same series of signals by way of line 17.

There has thus been shown improved apparatus for measuring various physical characteristics of a given liquid. These characteristics can be volume and weight, as well as temperature or density. There has been further shown, apparatus that can measure liquid levels and weight to a very high degree of precision, since these measurements are independent of temperature and further, since the measurements may be made over limited ranges where variations can be assumed to be of a linear nature.

As various changes might be made in the embodiments of the invention herein disclosed without departing from the spirit thereof, it is understood that all matter herein shown or described shall be deemed illustrative and not limiting except as set forth in the appended claims.

I claim:

1. Apparatus for measuring the quantity of liquid in a container, comprising sonic transducer means located in the liquid, said sonic transducer means including means for transmitting a pulse of sonic energy and receiving said pulse after said pulse has travelled a predetermined distance in the liquid, means for pulse exciting said transducer means, means responsive to said transducer means for triggering said exciting means each time said sonic transducer means receives a sonic pulse of energy which has travelled said predetermined distance for generating a first series of signals having a first frequency related to said predetermined distance, frequency divider means for dividing said first series of signals to at least a second series of signals having a second frequency, a sonic transducer located in said liquid responsive to said frequency divider means for transmitting a pulse of sonic energy toward the surface of the liquid for each of said second series of signals received, receiving means for receiving signals generated by said sonic transducer in response to pulses of sonic energy reflected from the liquid surface, and indicating means responsive to said receiving means and said frequency divider means for indicating the quantity of liquid in the container as determined by the time of occurrence of the signals from said receiving means and the time of occurrence of the signals from said frequency divider means.

2. Apparatus as in claim 1 wherein said indicating means indicates the quantity of liquid in the container in accordance with the difference in time between the occurrence of one of said second series of signals and the associated signal received by said receiving means.

3. Apparatus as in claim 1 wherein said frequency divider means generates a third series of signals having a frequency intermediate said first and second frequencies, and said indicating means indicates the quantity of liquid in the container in accordance with the phase difference between the signals of said third series and the signals received by said receiving means.

4. Apparatus as in claim 1 wherein said sonic transducer means comprises a transmitting transducer and a receiving transducer at a predetermined spacing from each other whereby pulses of sonic energy transmitted by said transmitting transducer are received at a later time by said receiving transducer.

5. Apparatus for measuring the quantity of liquid in a container, comprising a first sonic transducer located in the liquid, reflector means disposed at a predetermined spacing from said first sonic transducer, excitation means for exciting said first sonic transducer for transmitting sonic pulses of energy toward said reflector means, first receiving means responsive to said first sonic transducer for transmitting to said excitation means signals generated by said first sonic transducer in response to sonic pulses of energy received from said reflector means whereby a first series of signals is generated having a first frequency determined by the spacing of said first sonic transducer and said reflector means, frequency divider means for dividing said first series of signals to at least a second series of signals having a second frequency, a second sonic transducer in said liquid for transmitting pulses of sonic energy toward the liquid surface in response to signals of said second series of signals, second receiving means for transmitting signals generated by said second sonic transducer in response to pulses of sonic energy reflected from the liquid surface, and indicating means for indicating the quantity of liquid in the container as determined by the time of occurrence of signals transmitted from said second receiving means and signals received from said frequency divider means.

6. Apparatus as in claim 5 wherein said indicating means indicates the quantity of liquid in accordance with the difference in time between the occurrence of one of the signals of said second series of signals and the associated signals received by said second receiving means.

7. Apparatus as in claim 6 wherein said indicating means includes a bistable voltage generating means which is turned on by the signal from said second series of signals and is turned off by the associated signal from said second receiving means.

8. Apparatus as in claim 7 wherein said indicating means includes a calibrated meter responsive to said bistable voltage generating means.

9. Apparatus as in claim 7 wherein said indicating means includes a gated pulse generator means having a predetermined pulse repetition rate and pulse counting means responsive to said gated pulse generator means.

10. Apparatus as in claim 5 wherein said frequency divider means generates a third series of signals, said indicating means indicating the quantity of liquid in accordance with the difference in time between the occurrence of signals in said third series of signals and signals transmitted by said second receiving means.

11. Apparatus as in claim 10 wherein said third series of signals have a frequency intermediate said first and second signal frequencies, and further including resolver means responsive to said third series of signals and the signals transmitted by said second receiving means to provide an output indicative of the quantity of liquid.

12. Apparatus as in claim 10 wherein said third series of signals have the same frequency as said second series of signals, each of the signals of said third series of signals occurring earlier in time than the associated signal of said second series of signals, the quantity of liquid being indicated by the difference in time of occurrence between a signal of said third series of signals and a related signal transmitted by said second receiving means.

13. Apparatus as in claim 12 wherein said indicating means includes a bistable voltage generating means which is turned on by a signal from said third series of signals and is turned off by a signal from said second receiving means.

14. Apparatus as in claim 13 wherein said indicating means includes a direct current meter responsive to said bistable voltage generating means.

15. Apparatus as in claim 13 wherein said indicating means includes a gated pulse generator means responsive to said bistable voltage generator means, said gated pulse generator means having a predetermined pulse repetition rate, and pulse counting means responsive to said gated pulse generator means.

16. Apparatus for measuring the quantity of liquid in a container, comprising sonic transducer means disposed in the liquid, said transducer means including means for receiving a pulse of sonic energy emitted by said transducer means after said pulse of sonic energy has travelled a predetermined distance in the liquid, means for pulse exciting said transducer means, means responsive to said transducer means for triggering said exciting means each time said transducer means receives a pulse of sonic energy that has travelled said predetermined distance, whereby to generate a first series of signals having a first frequency related to said predetermined distance, frequency divider means for generating a periodically varying signal having a second frequency smaller than said first frequency and a second series of pulses having a third frequency smaller than said second frequency, a sonic transducer in the liquid responsive to said divider means for transmitting a pulse of sonic energy toward the liquid surface for each of the pulses received, receiving means for receiving the pulses generated by said sonic transducer in response to receipt of pulses of sonic energy reflected from the liquid surface, resolver means responsive to said periodically varying signal and said receiving means for providing an output indicative of the transit time of pulses of sonic energy transmitted by said sonic transducer in the liquid, potentiometer means having an element thereof calibrated in relation to the cross-section of the container and a second element coupled to the output of said resolver means, and a source of potential coupled across said potentiometer means whereby a voltage is generated which is proportional to the quantity of liquid in the container.

17. Apparatus as in claim 16 wherein the output of the resolver means comprises an angularly displaceable shaft and said second element of the potentiometer means comprises a movable contact coupled to said displaceable shaft.

18. Apparatus for indicating the difference between a desired and actual quantity of liquid in a container comprising the apparatus of claim 17, and further including second potentiometer means having a resistance equal to the resistance of the first potentiometer means, the movable contact of said second potentiometer means being positionable in accordance with selected quantities of liquid, said source of potential being connected across said first and second potentiometer means, and voltage comparator means for comparing the voltages on the movable contacts of the respective potentiometer means.

19. Apparatus for measuring the weight of a liquid in a container at temperatures varying from a predetermined temperature comprising the apparatus of claim 16, wherein the first mentioned element of the potentiometer means is calibrated in accordance with the cross-section of the container and the density of the liquid at said predetermined temperature, and further including frequency discriminator means serially interposed between said potentiometer means and said source of potential for receiving said first series of pulses, said discriminator means being tuned to the frequency of said first series of pulses when the liquid is at said predetermined temperature, whereby a voltage is algebraically added to the voltage across said potentiometer means when the liquid temperature deviates from said predetermined temperature.

20. Apparatus as in claim 18 further operative to indicate the difference between a desired and actual quantity of liquid in a container at temperatures varying from a predetermined temperature, said first mentioned element of the potentiometer means being calibrated in accordance with the cross-section of the container and the density of the liquid at the predetermined temperature, and frequency discriminator means serially interposed between the first mentioned element of the first potentiometer means and said source of potential for receiving said first series of pulses, said discriminator means being tuned to the frequency of said first series of pulses when the liquid is at said predetermined temperature whereby a voltage is algebraically added to the voltage across said first potentiometer means when the liquid temperature varies from said predetermined temperature.

21. Apparatus as in claim 18 for indicating when a predetermined weight of liquid passes into a container, the liquid having temperatures varying from a predetermined temperature, the first element of the first potentiometer means being calibrated in accordance with the cross-section of the container and the liquid density at the predetermined temperature, frequency discriminator means serially interposed between the first element of the first potentiometer means and said source of potential for receiving said first series of pulses, said discriminator means being tuned to the frequency of said first series of pulses when the liquid is at said predetermined temperature, whereby a voltage is algebraically added to the voltage across said first potentiometer means when the liquid temperature varies from said predetermined temperature, and indicator means responsive to said voltage comparator means for giving an indication when the signal transmitted by said voltage comparator means has a predetermined value.

References Cited in the file of this patent

UNITED STATES PATENTS

| | | |
|---|---|---|
| 2,333,688 | Shepard | Nov. 9, 1943 |
| 2,400,309 | Kock | May 14, 1946 |
| 2,511,599 | Rochester | June 13, 1950 |
| 2,753,542 | Rod et al. | July 3, 1956 |
| 2,756,404 | Anderson et al. | July 24, 1956 |
| 2,841,775 | Saunders | July 1, 1958 |
| 2,978,899 | Kritz | Apr. 11, 1961 |
| 3,028,578 | Stanton | Apr. 3, 1962 |

OTHER REFERENCES

"Sing-Around Ultrasonic Velocimeter for Liquids," The Review of Scientific Instruments, by Greenspan et al., vol. 28, No. 11, November 1957 (pp. 897–901).